United States Patent [19]

Lloyd

[11] Patent Number: 4,939,398
[45] Date of Patent: Jul. 3, 1990

[54] LAMINATED ASSEMBLIES WITH IN SITU MOLDED MAGNETS

[75] Inventor: Jerry D. Lloyd, St. Louis County, Mo.

[73] Assignee: Emerson Electric Co., St. Louis, Mo.

[21] Appl. No.: 298,101

[22] Filed: Jan. 17, 1989

Related U.S. Application Data

[62] Division of Ser. No. 916,005, Oct. 6, 1986, Pat. No. 4,845,837.

[51] Int. Cl.$^5$ .......................... H02K 1/06; H02K 1/30
[52] U.S. Cl. ...................................... 310/156; 29/598; 310/43; 310/211; 310/216
[58] Field of Search .................. 29/598, 596; 310/156, 310/216, 217, 42, 43, 211, 154

[56] References Cited

U.S. PATENT DOCUMENTS

| | | | |
|---|---|---|---|
| 2,062,938 | 12/1936 | Ruppe | 310/216 |
| 2,939,025 | 5/1960 | Williford, Jr. | 310/156 |
| 3,872,334 | 3/1975 | Loubier | 310/156 |
| 4,434,546 | 3/1984 | Hershberger | 310/156 |
| 4,494,028 | 1/1985 | Brown | 310/156 |
| 4,642,502 | 2/1987 | Carpenter et al. | 310/156 |
| 4,712,035 | 12/1987 | Forbes et al. | 310/269 |
| 4,839,546 | 6/1989 | Kitahara | 310/156 |

Primary Examiner—Patrick R. Salce
Assistant Examiner—D. L. Rebsch
Attorney, Agent, or Firm—Polster, Polster and Lucchesi

[57] ABSTRACT

A rotor assembly for a permanent magnet motor includes a set of laminations forming a rotor body, each lamination having a first magnet slot therein. A generally rectangular permanent magnet is disposed in the magnet slot, the magnet slot of each lamination being shaped so as to receive the rectangular permanent magnet through all the skewed laminations with a minimum air gap. A method of making an assembly such as a rotor includes the steps of providing an assembly body made of ferromagnetic material defining at least one magnet slot therein. The slot is at least partially filled with a mixture of magnetizable particles in a binder. The mixture is compressed and then cured, to bond the magnetizable particles together in the slot, and the bonded particles are then magnetized in the slot to form a magnet in situ in the slot without an air gap.

25 Claims, 3 Drawing Sheets

FIG. 8.
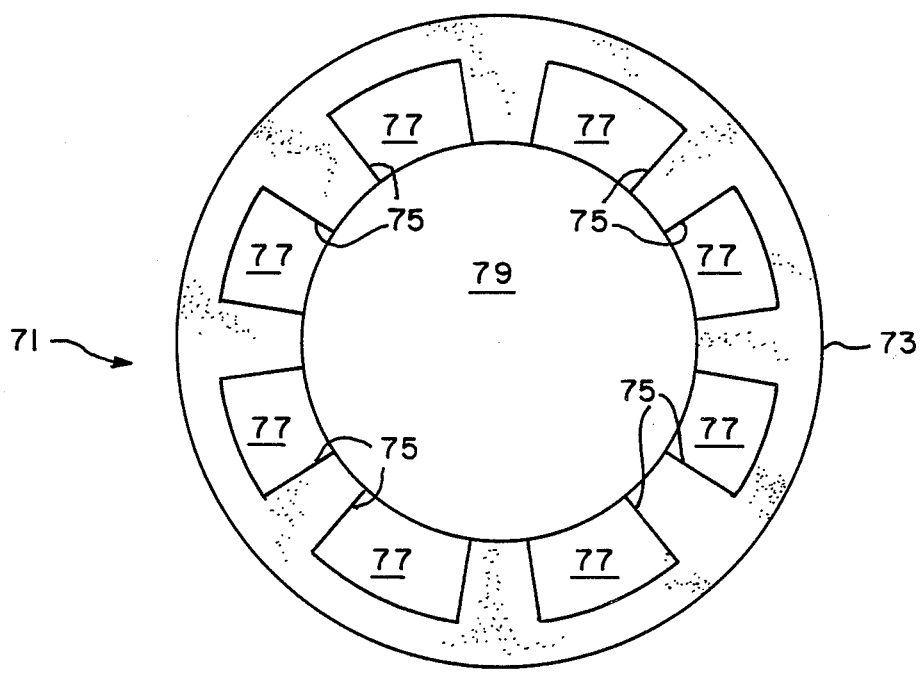
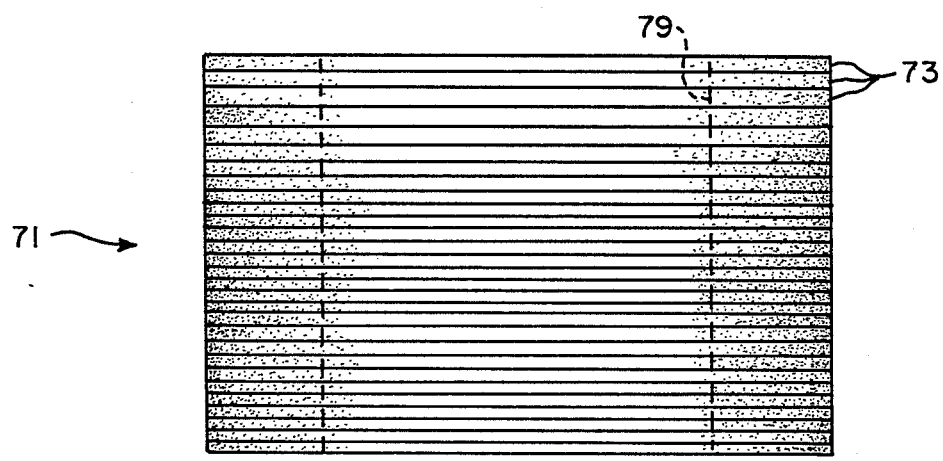
FIG. 9.

LAMINATED ASSEMBLIES WITH IN SITU MOLDED MAGNETS

This is a divisional of co-pending application Ser. No. 916,005, filed on Oct. 6, 1986, now U.S. Pat. No. 4,845,837.

BACKGROUND OF THE INVENTION

This invention relates to permanent magnet assemblies and more particularly to self-retaining permanent magnet assemblies.

Permanent magnets are used in a variety of assemblies such as electric motor rotors, electric motor stators, loudspeakers, and the like. Although the present invention is described herein with particular reference to electric motor assemblies, it should be realized that the present invention is not so limited but instead extends to permanent magnetic assemblies for a wide variety of purposes.

By way of example, in certain electric motors and the like of the synchronous rotor type, the motors have a cage rotor construction with conductor bars for the rotor made of die-cast aluminum. Typically, rotor assemblies for these motors include a stack or rotor core of individual laminations constructed from suitable ferromagnetic material. Each lamination has a central opening and a plurality of so-called satellite openings adjacent to its outer margin. The laminations are assembled in a stack and the laminations are rotated slightly with respect to one another in the stack so that their central openings are coaxial but their satellite openings are skewed relative to one another to form skewed slots. The lamination stack or core is then placed in a suitable die-casting mold and molten aluminum is injected under pressure into the molds so as to surround the core, fill the mold, and flow through the skewed slots in the core formed by the satellite opening so as to form the conductor bars of the rotor. In addition, each lamination includes one or more magnet slots in which are mounted pre-formed permanent magnets, which are commonly in the shape of rectangular bars. These bar-shaped permanent magnets must be mounted in the magnet slots and suitably secured therein. However, if these slots are skewed, it is normally necessary to use a smaller than desired magnet to fit into the skewed slot, which results in a larger than desired air gap, or to use specially designed magnets (rather than the standard bar-shaped magnets) which increases the cost of the rotor assembly substantially. Even in those cases where skewing of the rotor laminations is not needed, it would sometimes be preferable to have various non-rectangular shapes for a magnet slot to provide the desired magnetic flux. But the use of custom-made magnets of these various shapes is not economical. Even when permanent magnets of the desired shape are available, there still exists an undesirable air gap between the magnets and the laminations because of the necessary manufacturing tolerances.

SUMMARY OF THE INVENTION

Among the several objects and features of the present invention may be noted the provision of a lamination construction which permits the use of rectangular permanent magnets even when the laminations are skewed with respect to each other.

Another object of the present invention is the provision of a method of making a permanent magnet assembly which includes permanent magnets of arbitrary shape at an economical cost.

A third object of the present invention is the provision of a rotor assembly which is economical in construction.

A fourth object of the present invention is the provision of a permanent magnet assembly with a minimum air gap.

A fifth object of the present invention is the provision of a method of making a permanent magnet assembly which allows the designer increased choice in the placement and shape of the permanent magnets in the assembly.

Other objects and features will be in part apparent and in part pointed out hereinafter.

Briefly, the method of the present invention includes the steps of providing an assembly body of ferromagnetic material, the body defining at least one magnet slot therein, filling the slot at least partially with a mixture of magnetizable particles in a binder, exerting pressure on the mixture to compress the material in the slot, and curing the mixture without significantly shrinking the material in the slot to bond the magnetizable particles together in the slot. The bonded particles in the slot are then magnetized in situ to form a magnet in the slot. The slot is shaped so as to retain the magnet in place therein.

In a first embodiment, a rotor for a dynamoelectric machine of the present invention includes a stack of rotor laminations of ferromagnetic material. Each lamination has a magnet slot formed therein, which laminations are aligned so as to form a magnet slot extending through the stack. A permanent magnet is disposed in the magnet slot without an air gap between the magnet and the slot, the permanent magnet comprising a cured mixture of magnetizable particles in a binder. The permanent magnet is formed in situ in the magnet slot.

A stator assembly of the present invention includes a stack of stator laminations of ferromagnetic material. Each lamination has a plurality of magnet slots formed therein and the laminations are aligned so as to form a plurality of continuous magnet slots extending through the stack. A plurality of permanent magnets, one for each slot, are formed in situ in their respective slots without an air gap between the magnet and the slot.

A permanent magnet assembly of the present invention includes an assembly body of ferromagnetic material, each body defining at least one magnet slot therein. A permanent magnet is formed in situ in its respective slot without an air gap between the magnet and the slot, the slot being configured to retain the magnet in place therein.

A second embodiment of the rotor assembly for a permanent magnet dynamoelectric machine of the present invention includes a set of laminations secured together to form a rotor body. Each lamination has at least a first magnet slot therein, the first magnet slots of the various laminations being substantially identical. The laminations in the rotor assembly are rotationally skewed with respect to each other. A rotor shaft is disposed along the longitudinal axis of the rotor body, and a generally rectangular permanent magnet is disposed in the first magnet slot. The first magnet slot of each lamination is shaped so as to receive the rectangular permanent magnet through all the skewed laminations with a minimum air gap.

BRIEF DESCRIPTION OF THE DRAWINGS

FIG. 8 is a top plan of a stator assembly of the present invention;

FIG. 9 is an elevation of the stator assembly of FIG. 8;

Similar reference characters indicate similar parts throughout the several views of the drawings.

DESCRIPTION OF THE PREFERRED EMBODIMENTS

Figure 1:
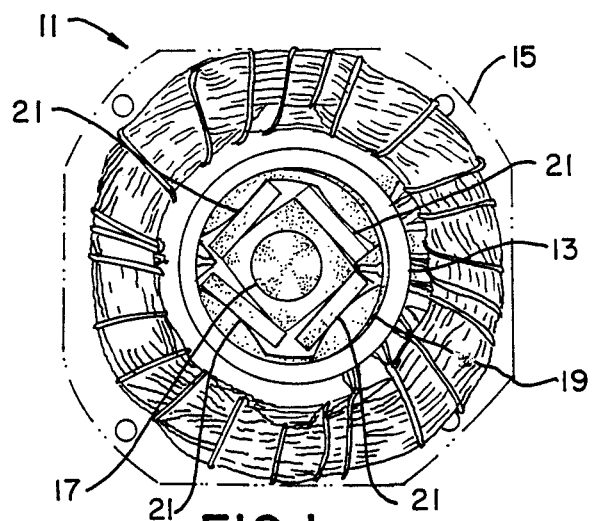
FIG. 1 is a right side elevation of a dynamoelectric machine utilizing a rotor assembly of the present invention.

A permanent magnet motor 11 (FIG. 1) includes a rotor assembly 13 of the first embodiment of the present invention suitably journalled for rotation with respect to a stator 15. Rotor 13 includes a rotor shaft 17 to which are suitably secured a stack of laminations 19 having a series of magnet slots therein for receiving a plurality (four in this example) of rectangular permanent magnets 21. Permanent magnets 21 are of conventional rectangular bar magnet construction to minimize the cost of permanent magnet motor 11. Each lamination is, for example, approximately 0.022 inches in width.

Figure 2:
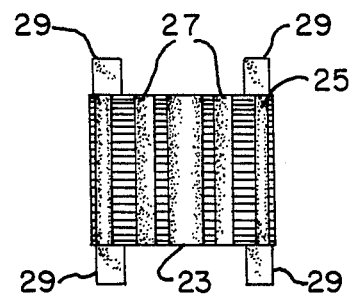
FIG. 2 is a sectional view illustrating the construction of the rotor assembly of the present invention.
Figure 3:
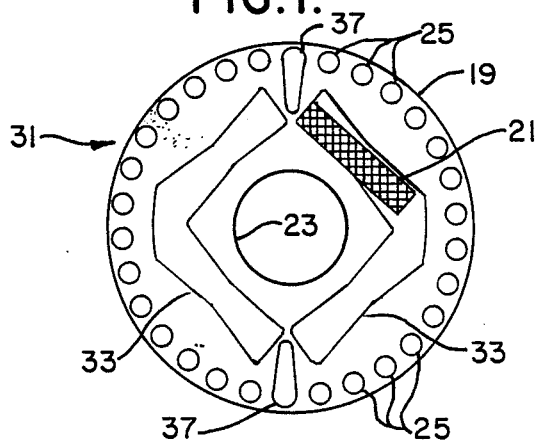
FIG. 3 is a top plan view illustrating one embodiment of the laminations used with the rotor assembly of FIG. 2 illustrating the position of a rectangular bar magnet in a magnet slot of such a lamination.

Laminations 19 each have a series of openings therein (see FIGS. 2 and 3). For example, all of the laminations have a central bore 23 therein as well as a plurality (e.g. twenty-eight) of rotor cage slots 25 around the periphery of each lamination. Between the cage slots 25 and central bore 23 are permanent magnet slots labelled 27 in FIG. 2 for receiving permanent magnets 21. A similar set of magnet slots 33 particularly useful when the laminations are skewed, is shown in FIG. 3.

To construct the rotor assembly of FIG. 2, laminations 19 are stacked together in a core approximately 1.875 inches in height, for example, in the proper orientation with respect to each other. A rotor cage of aluminum is then die-cast in place to hold the laminations in place with respect to each other. A pair of end rings 29 approximately one-half inch in height are die-cast in place at each end of the stack at the same time. The rotor shaft may be secured to the rotor assembly in this die-casting step or otherwise suitably secured to the assembly.

Turning to FIG. 3, a single lamination 19 of the rotor assembly 31 of the present invention is shown in combination with one permanent magnet 21. The four permanent magnets of FIG. 1 fit in the pair of generally V-shaped slots 33 disposed in each of the laminations. The legs of the V-shaped slots are not straight but instead have a "bow-tie" configuration. That is, the end and the base of each leg define the widest portion of the corresponding magnet slot and these slots taper from those points to the midpoint of the slot. The angle of the taper is generally equal to the angle through which the laminations are rotated so that even when skewed, the laminations still accept the rectangular bar magnets 21. This is illustrated in more detail in FIG. 4 which shows by hatched lines the outline of the various slots 33 of the laminations in a skewed stack. Although the actual outlines of these slots differ because of the skewing or rotation of the laminations with respect to each other, it can be seen that the resulting passage 35 through all the laminations is generally rectangular in shape. This allows magnet 21 to be inserted in passage 35 without binding upon any of the laminations.

Figure 4:
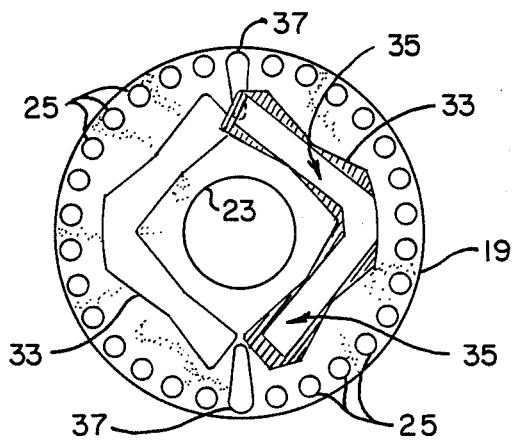
FIG. 4 is a view similar to FIG. 3 illustrating the positions of a magnet slot in a skewed stack of laminations.

It should be appreciated that skewing of the laminations with respect to each other results in four rectangular passageways through the set of laminations 19 for receipt of all four permanent bar magnets 21 even though only two of these passageways are shown in FIG. 4 for purposes of clarity. Moreover, this particular slot configuration minimizes the air gap between the magnets and the laminations while maximizing the size of rectangular bar magnet which can be used in the slots. Also shown in FIGS. 3 and 4 are a pair of slots 37 which provide reluctance barriers between magnets 21. These barriers may be filled with aluminum during the die-casting process.

In the embodiment of FIGS. 1–4, the designer is limited by several factors, including the limited number of sizes and shapes of magnets 21 available and the air gap between these magnets and their slots which, although minimized, are of necessity present when the stack of laminations is skewed. These problems are completely overcome in the embodiments of FIGS. 5-12, which free the designer to concentrate on the necessary flux without substantial restriction as to magnet size or shape.

Figure 5:
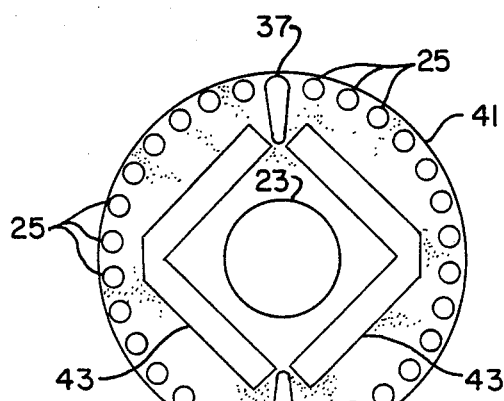
FIG. 5 is a top plan view of a second embodiment of the laminations used in the present invention.

An alternative embodiment of lamination 19, labeled 41, is shown in FIG. 5. Magnet slots 43 in this embodiment are generally V-shaped but have straight sides instead of the "bow-tie" configuration of slots 33. These laminations have cage slots 25 and reluctance barrier slots 37, although neither forms a necessary part of the present invention. The magnets for slots 43 are molded in situ using a low shrinkage permanent magnet material such as that sold by Delco Remy under the trade designation Magnequench MQ-1. This particular material is 98% boron-neodymium-iron with a 2% epoxy binder, and is believed to be made in accordance with U.S. Pat. No. 4,496,395 to Croat. This particular material is placed in powder form into slots 43 and then compressed with a force of approximately 66 tons per square inch. It is then cured at 300 degrees to form the magnetic material into a solid piece in the slots 43 in the stack of laminations. This not only allows a magnet to be formed in situ for any particular desired shape of magnet slot but also creates a low cost way of holding the magnets in place. By way of contrast, the permanent magnets 21 of the first embodiment are held in place by die-cast aluminum, or shims, or adhesive. The material which is cured in magnet slots 43 is in an unmagnetized state during the curing process. During curing there is hardly any shrinkage of the formed magnet in the slot due to the nature of the magnetic material itself. Thus, there results a magnet in slots 43 which is without an air gap between the magnet itself and the laminations 41. Once the magnet is formed in place it is then magnetized in situ to form a two-pole rotor, for example. Of course, various magnetizations could be used depending upon the particular magnetic construction one wanted the rotor to have. Note that with the proper fixtures, the magnetizable material may be compressed to the proper compression whether or not the lmainations 41 are skewed.

Figure 6:
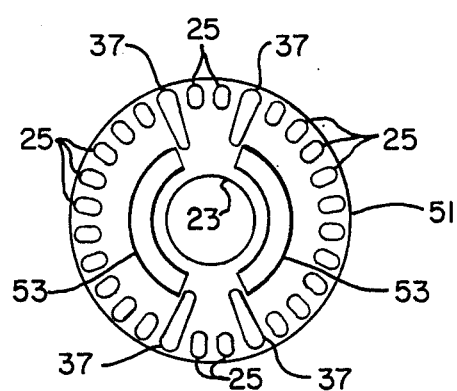
FIG. 6 is a top plan view of a third embodiment of the laminations of the present invention.

A third embodiment of the lamination of the present invention is shown in FIG. 6 and labeled 51. This particular lamination includes four reluctance barrier slots 37 disposed as shown with a pair of rotor cage slots 25 disposed between each pair of reluctance barrier slots 37. In addition, the magnet slots labeled 53 of this lamination are generally arc-shaped. The in situ magnetic material discussed in connection with FIG. 5 may be inserted in the arc-shaped slots of lamination 51 and formed into a suitable pair of magnets therein using the same process as described above in connection with FIG. 5. The magnets so formed may have any desired polarity. For example, the north pole of the rightmost magnet in the configuration shown in FIG. 6 could be on the outer side of that arc while the north pole on the left most magnet as shown in FIG. 6 could be on the inner side of the corresponding magnet arc. Of course, since the magnet is formed in situ, the laminations 51 may be skewed or not as desired for the particular application. Note that using the method of the present invention, the designer is freed from using permanent magnets of only certain shapes. If the designer wants a certain flux and number of poles which are not available with one configuration a different arbitrary magnet configuration can be chosen, independently of the permanent magnet shapes which are commercially available. The designer is freed to make the best permanent magnet assembly, not just the best assembly which can be made from commercially available components.

In yet another embodiment of the present invention, a lamination 61 (FIG. 7), similar to that shown in FIG. 6 includes the pair of arc-shaped magnet slots 53 and rotor cage slots 25 around its periphery. This particular lamination 61 includes a pair of reluctance barrier slots 63 having a generally anvil-shape. These reluctance barrier slots may be filled with aluminum or other suitable material during the die-casting operation. Thereafter, the magnetizable material is inserted into slots 53 and the permanent magnets are formed therein in situ as described above.

Although the invention has been described to this point with respect to a rotor assembly, it is not so limited. As shown in FIGS. 8 and 9, the present invention is equally applicable to stator assemblies for dynamoelectric machines and is in general applicable to any permanent magnet assembly.

A stator assembly 71 of the present invention includes a stack or body of laminations 73 of suitable ferromagnetic material or the like. Each lamination has formed therein a plurality of magnet slots 75 in which are formed in situ a plurality of permanent magnets 77 as described above in connection with a rotor assembly. In FIG. 8, eight magnet slots 75 and eight permanent magnets 77 are shown. These can be magnetized to create at least an eight-pole stator. Of course this number is illustrative. Any desired number of poles could be formed in this manner. The slots 75 of stator 71 differ from the magnet slots previously described in that they are open to the interior central bore 79 of the stator assembly. It should be noted that the magnet slots 75 are smaller at their mouths than at the rear portion of the magnet so that the shape of the slot and the magnet itself holds the magnet in its respective slot. Of course, when forming the magnets 77 it is necessary to place some fixture in central bore 79 to prevent the powder-like material from flowing out of magnet slot 75 until it is compressed and/or cured. Similar shapes could be used for the magnet slots of the rotor assemblies described above so that those magnet slots also extend to the periphery of their laminations. All that is required is that the laminations be one continuous piece and that the shape of the slot be configured so that it holds its associated permanent magnet in place, once the magnet is formed therein.

Figure 7:
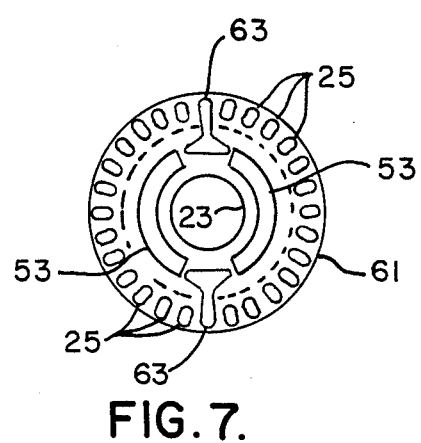
FIG. 7 is a top plan view of a fourth embodiment of the laminations of the present invention.
Figure 10:
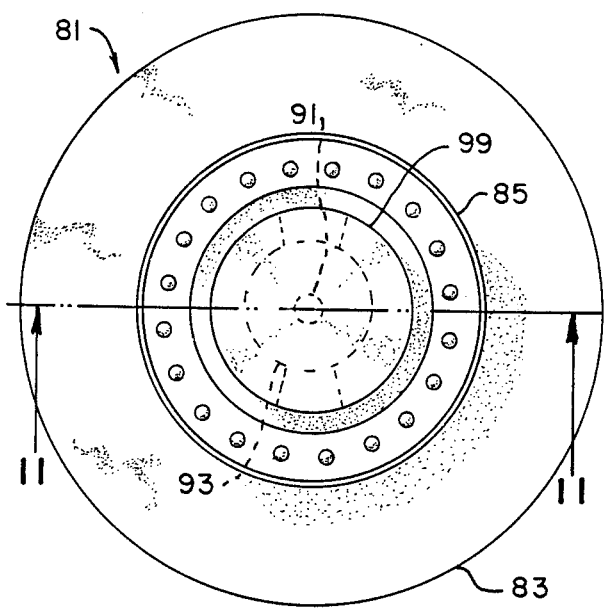
FIG. 10 is a top plan illustrating a fixture used with the rotors of FIGS. 5 through 7.
Figure 11:
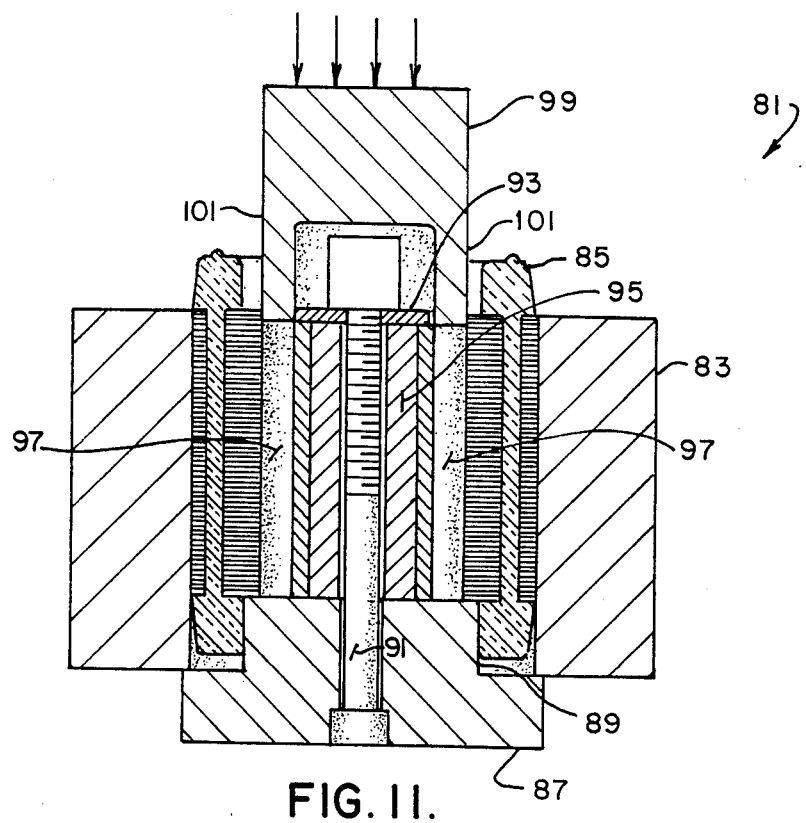
FIG. 11 is a cross-sectional view taken generally along line 11—11 of FIG. 10.

A fixture 81 suitable for providing the necessary compression to the magnetizable material used with the laminations of FIGS. 5 through 7 is shown in FIGS. 10 and 11. This fixture includes a cylindrical collar 83 which supports a rotor 85 made up of laminations such as that shown in FIG. 7 against lateral forces. Due to the large nature of the forces involved in compressing the magnetizable material, collar 83 and the load-bearing members of fixture 81 are preferably made of tool-steel or the like. Collar 83 and rotor 85 rest upon a base 87 of tool-steel. Base 87 includes a pedestal 89 suitable for supporting rotor 85 from below. Rotor 85 is suitably secured to base 87 by means of a bolt 91 secured at its bottom to base 87. Bolt 91 extends upwardly through the central bore of rotor 81 and is secured to a threaded washer 93 at the top of the assembly, which washer holds rotor 85 in place. Of course, this connection need not be particularly strong since it is acting in the same direction as the compressive forces which are applied to rotor 85. If necessary, a bushing 95 may be disposed around bolt 91 to fill the central bore of the rotor.

Rotor 85 includes a pair of magnet slots 97 in which are disposed the magnetizable particles described above. Fixture 81 also includes a plunger 99 having a pair of downwardly extending ears 101 which are shaped to precisely fit in the slots 97 filled with the magnetizable material. Application of force in the direction shown by the arrows in FIG. 11 thereby results in compression of the magnetizable material in slots 97. As should be appreciated, if the laminations of rotor 85 are skewed, it would be desirable to use plungers 99 of suitable shape at both the top and the bottom of slots 97 to ensure complete compression of all the magnetizable particles.

Figure 12:
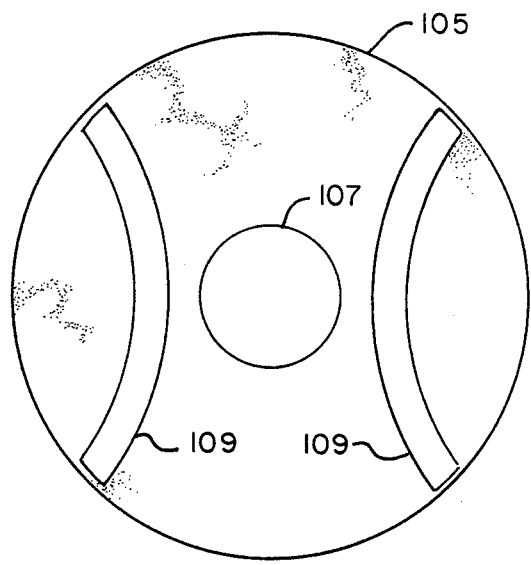
FIG. 12 is a top plan view of a fifth embodiment of the laminations of the present invention.

Although the rotors previously described are all of cage construction, the present invention is not so limited. In FIG. 12 there is shown a rotor lamination 105 of suitable ferromagnetic material having a central opening 107 for the rotor shaft and a pair of arc-shaped magnet openings 109, but no cage slots. In this embodiment, the laminations of the rotor stack are suitably secured together by an adhesive or the like before the magnetizable powder is inserted in magnet slots 109 and compressed.

From the above it will be seen that the various objects and features of the present invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A rotor for a dynamoelectric machine comprising:
a rotor body of ferromagnetic material or the like, said body being composed of a plurality of laminations and defining at least one magnet slot therein;
a permanent magnet formed in situ in its respective slot without an air gap between the magnet and the slot, said magnet being formed from a cured mixture of magnetizable particles in a binder, said slot being configured to retain the magnet in place therein;
the laminations being skewed with respect to each other, said permanent magnet slot being thereby skewed as well, said permanent magnet being formed in situ in said skewed configuration.

2. The rotor as set forth in claim 1 wherein the rotor body has a plurality of magnet slots therethrough, further including a plurality of permanent magnets, one for each slot, formed in situ in its respective slot.

3. The rotor as set forth in claim 1 wherein said permanent magnet has a density substantially greater than the density of the loose magnetizable particles from which it is composed, said particles in the process of making the permanent magnet in situ being subjected to a compressive force.

4. The rotor as set forth in claim 3 wherein the compressive force is approximately 66 tons per square inch.

5. The rotor as set forth in claim 1 wherein the magnet slot is configured to retain the permanent magnet in place.

6. The rotor as set forth in claim 5 wherein the magnet slot through each lamination is encircled by its lamination.

7. The rotor as set forth in claim 1 wherein the permanent magnet is formed in situ in its slot without significant shrinkage of the material of which the magnet is composed to preclude the formation of an air gap.

8. A precursor to a stator assembly for a dynamoelectric machine comprising:
a stack of stator laminations of ferromagnetic material or the like, each lamination having a plurality of magnet slots formed therein, the laminations being aligned so as to form a plurality of continuous magnet slots extending through the stack;
a plurality of unmagnetized permanent magnet precursors, one for each slot, formed in situ in their respective slots without an air gap between each magnet precursor and its slot, said unmagnetized magnet precursors being formed from a cured mixture of magnetizable particles in a binder.

9. A permanent magnet assembly comprising:
an assembly body of ferromagnetic material or the like, said body being composed of a plurality of laminations and defining at least one magnet slot therein;
a permanent magnet formed in situ in its respective slot without an air gap between the magnet and the slot, said magnet being formed from a cured mixture of magnetizable particles in a binder, said slot being configured to retain the magnet in place therein;
the laminations being skewed with respect to each other, said permanent magnet slot being thereby skewed as well, said permanent magnet being formed in situ in said skewed configuration.

10. The precursor as set forth in claim 8 wherein each permanent magnet precursor has a density substantially greater than the density of the loose magnetizable particles from which it is composed, said particles in the process of making the permanent magnet precursors being subjected to a compressive force.

11. The precursor as set forth in claim 8 wherein each magnet slot is configured to retain its permanent magnet precursor in place.

12. The stator assembly as set forth in claim 11 wherein each magnet slot through each lamination is encircled by its lamination.

13. A precursor to a permanent magnet assembly comprising:
an assembly body of ferromagnetic material or the like, said body defining at least one magnet slot therein;
an unmagnetized permanent magnet precursor formed in situ in its respective slot without an air gap between the magnet precursor and the slot, said unmagnetized magnet precursor being formed from a cured mixture of magnetizable particles in a binder, said slot being configured to retain the magnet precursor in place therein.

14. The permanent magnet assembly as set forth in claim 9 wherein the assembly body has a plurality of magnet slots therethrough, further including a plurality of permanent magnets, one for each slot, formed in situ in its respective slot.

15. The permanent magnet assembly as set forth in claim 9 wherein said permanent magnet has a density substantially greater than the density of the loose magnetizable particles of which it is composed, said particles in the process of making the permanent magnet being subjected to a compressive force.

16. The permanent magnet assembly as set forth in claim 15 wherein the compressive force is approximately 66 tons per square inch.

17. The stator assembly as set forth in claim 8 wherein the magnetizable particles of a particular slot are compressed together in the process of forming the magnet in situ, said compressed particles being thereafter cured in situ without significant shrinkage, thereby precluding formation of an air gap.

18. The permanent magnet assembly as set forth in claim 9 wherein the magnet slot through each lamination is encircled by its lamination.

19. The permanent magnet assembly as set forth in claim 9 wherein the permanent magnet is formed in situ in its slot without significant shrinkage of the material of which the magnet is composed to preclude the formation of an air gap.

20. The permanent magnet assembly as set forth in claim 9 wherein the magnetizable particles of the slot are compressed together in the process of forming the magnet in situ, said compressed particles being thereafter cured in situ without significant shrinkage, thereby precluding formation of an air gap.

21. A rotor assembly for a permanent magnet dynamoelectric machine comprising:
a set of laminations secured to form a rotor body, each lamination including a plurality of generally V-shaped slots therein, said V-shaped slots of the various laminations being substantially identical, the laminations being rotationally skewed with respect to each other;

a rotor shaft disposed along the longitudinal axis of the rotor body; and a generally rectangular permanent magnet disposed in each leg of the V-shaped slots;

the V-shaped magnet slots being shaped so as to receive the rectangular permanent magnet through all the skewed laminations with a minimum air gap;

each leg of the V-shaped slots being generally wider at each end of the leg and tapering to a waist near the midpoint of the leg.

22. The rotor assembly as set forth in claim 2 wherein the waist separates each side of its leg into first and second portions, the first portion of a first side of each leg of the V-shaped slot being generally parallel to the second portion of the opposite, second side of that leg and the first portion of the second side of each leg being generally parallel to the second portion of the first side of that leg.

23. The rotor assembly as set forth in claim 21 wherein the base of the V-shaped slot is generally elongated and rounded.

24. A rotor assembly for a permanent magnet dynamoelectric machine comprising:

a set of laminations secured together to form a rotor body, each lamination having at least a first magnet slot therein, said first magnet slots of the various laminations being substantially identical, the laminations being rotationally skewed with respect to each other;

a rotor shaft disposed along the longitudinal axis of the rotor body; and a generally rectangular permanent magnet disposed in the first magnet slot;

the first magnet slot of each lamination being shaped so as to receive said rectangular permanent magnet through all the skewed laminations with a minimum air gap;

the magnet slot being generally wider at each end of the slot and tapering to a waist near the midpoint of the slot.

25. The rotor assembly as set forth in claim 24 wherein first and second lines intersecting and terminating at the waist of the slot define one side of the slot and third and fourth lines intersecting and terminating at the waist of the slot define the opposite side of the slot, said first and third lines being parallel and on opposite sides of the waist and the second and fourth lines being parallel and on opposite sides of the waist.

* * * * *